United States Patent [19]
Girmay

[11] Patent Number: 6,121,992
[45] Date of Patent: Sep. 19, 2000

[54] SYNCHRONIZATION OF MULTIPLE ROS FOR IMAGE REGISTRATION IN A SINGLE PASS SYSTEM

[75] Inventor: Girmay K. Girmay, La Mirada, Calif.

[73] Assignee: Xerox Corporation, Stamford, Conn.

[21] Appl. No.: 09/175,209

[22] Filed: Oct. 19, 1998

[51] Int. Cl.[7] ................................................ B41J 2/47
[52] U.S. Cl. ................................. 347/234; 347/116
[58] Field of Search ............................. 347/116, 231, 347/233, 234, 225, 243, 259, 260, 261, 117, 118

[56] References Cited

U.S. PATENT DOCUMENTS

| | | | |
|---|---|---|---|
| 5,331,341 | 7/1994 | Egawa et al. | 347/261 |
| 5,337,076 | 8/1994 | Agano | 347/261 |
| 5,381,165 | 1/1995 | Lofthus et al. | 346/108 |
| 5,521,739 | 5/1996 | Mirchandani | 359/216 |
| 5,892,533 | 4/1999 | Tanimoto et al. | 347/261 |

*Primary Examiner*—N. Le
*Assistant Examiner*—Lamson D. Nguyen
*Attorney, Agent, or Firm*—William Propp

[57] ABSTRACT

A single pass ROS system provides a plurality of latent images which may subsequently be developed in different colors. A method and apparatus is provided for aligning ROS units in a single pass printing system, so that each ROS unit is aligned along the process or X-axis. After this alignment, the images formed by each ROS unit will be in proper registration within the prescribed tolerances. A signal in a closed feedback loop regulates the angular velocity and phase of the rotating polygon mirror of the first ROS unit. The same signal is also the reference signal to the feedback loops of the other rotating polygon mirrors of the other ROS units to synchronize all of the rotating polygon mirrors. The position of the scan lines formed by their respective ROS units are fixed relative to one another and thus, lacking any other error sources, are registered in the process direction. A proportional integral derivative controller, the motor polygon assembly and a speed detector form the synchronization system for each ROS unit. The proportional integral derivative controller produces the synchronized signal for the MPA as a function of the proportional feedback signal, the integral feedback signal and the differential feedback signal. The speed detector in the feedback loop has an invertor, a feedback gain and a zero order hold to convert the velocity/phase signal from the MPA into a feedback signal. The feedback signal, a weighted summed feedback signal from a feedback adder from all the ROS units and a reference signal are input to the proportional integral derivative controller.

9 Claims, 3 Drawing Sheets

SYNCHRONIZATION OF MULTIPLE ROS FOR IMAGE REGISTRATION IN A SINGLE PASS SYSTEM

BACKGROUND OF THE INVENTION

The present invention relates to registration of multiple image exposures formed on a photoreceptor by a plurality of Raster Output Scanning (ROS) systems and, more particularly, to synchronization of multiple ROS's to form registered color images in a single pass system.

In color printing, successive images, each corresponding to a separate and different color, are formed. Each single color separation is transferred to a copy sheet in superimposed registration with any prior single color image. The registered relationship of the single color images creates a multi-layered image on the copy sheet which forms a composite color image. In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. This laser beam is modulated in conformance with the image information. The modulated beam is transmitted through a lens onto a scanning element, typically a rotating polygon having mirrored facets.

The light beam is reflected from a facet and thereafter focused to a "spot" on the photosensitive member. The rotation of the polygon causes the spot to scan across the photoconductive member in a fast scan (i.e. line scan) direction. Meanwhile, the photoconductive member is advanced relatively more slowly than the rate of the fast scan in a slow scan (process) direction which is orthogonal to the fast scan direction. In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper. Laser printers may operate in either a single pass or a multiple pass system.

In a single pass, process color xerographic printing system, three ROS stations are positioned adjacent to a photoreceptor surface and selectively energized to create successive image exposures, one for each of the three basic colors. A fourth ROS station may be added if black images are to be created as well. In a multiple pass system, each image area on the photoreceptor surface must make at least three passes relative to the transverse scan line formed by the modulated laser beam generated by a ROS system. With either system, each image must be registered to within a 0.1 mm circle or within a tolerance of ±0.05 mm. Each color image must be registered in both the photoreceptor process direction (slow scan or skew registration) and in direction perpendicular to the process registration (referred to as fast scan or transverse registration).

Any relative displacement of the color images is very noticeable. Different schemes have been proposed to solve this color misregistration. Errors in the image positioning can arise from changes in the velocity and phase of the rotating polygon mirrors in the ROS stations or units. Any motor polygon assembly (MPA) to MPA operational differences are eventually cascaded as color to color misregistration.

Synchronization of the multiple ROS's will minimize the misregistration of multiple image exposures formed on a photoreceptor by a plurality of Raster Output Scanning (ROS) systems in a single pass system.

It is an object of the present invention to register the color images by synchronizing the multiple ROS of the printing system.

SUMMARY OF THE INVENTION

According to the present invention, a method and apparatus is provided for aligning ROS units in a single pass printing system, so that each ROS unit is aligned along the process or X-axis. After this alignment, the images formed by each ROS unit will be in proper registration within the prescribed tolerances. A signal in a closed feedback loop regulates the angular velocity and phase of the rotating polygon mirror of the first ROS unit. The same signal is also the reference signal to the feedback loops of the other rotating polygon mirrors of the other ROS units to synchronize all of the rotating polygon mirrors. The position of the scan lines formed by their respective ROS units are fixed relative to one another and thus, lacking any other error sources, are registered in the process direction.

A proportional integral derivative controller, the motor polygon assembly and a speed detector form the synchronization system for each ROS unit. The proportional integral derivative controller produces the synchronized signal for the MPA as a function of the proportional feedback signal, the integral feedback signal and the differential feedback signal. The speed detector in the feedback loop has an invertor, a feedback gain and a zero order hold to convert the velocity/phase signal from the MPA into a feedback signal. The feedback signal, a weighted summed feedback signal from a feedback adder from all the ROS units and a reference signal are input to the proportional integral derivative controller.

Other objects and attainments together with a fuller understanding of the invention will become apparent and appreciated by referring to the following description and claims taken in conjunction with the accompanying drawings.

DESCRIPTION OF THE INVENTION

Figure 1:
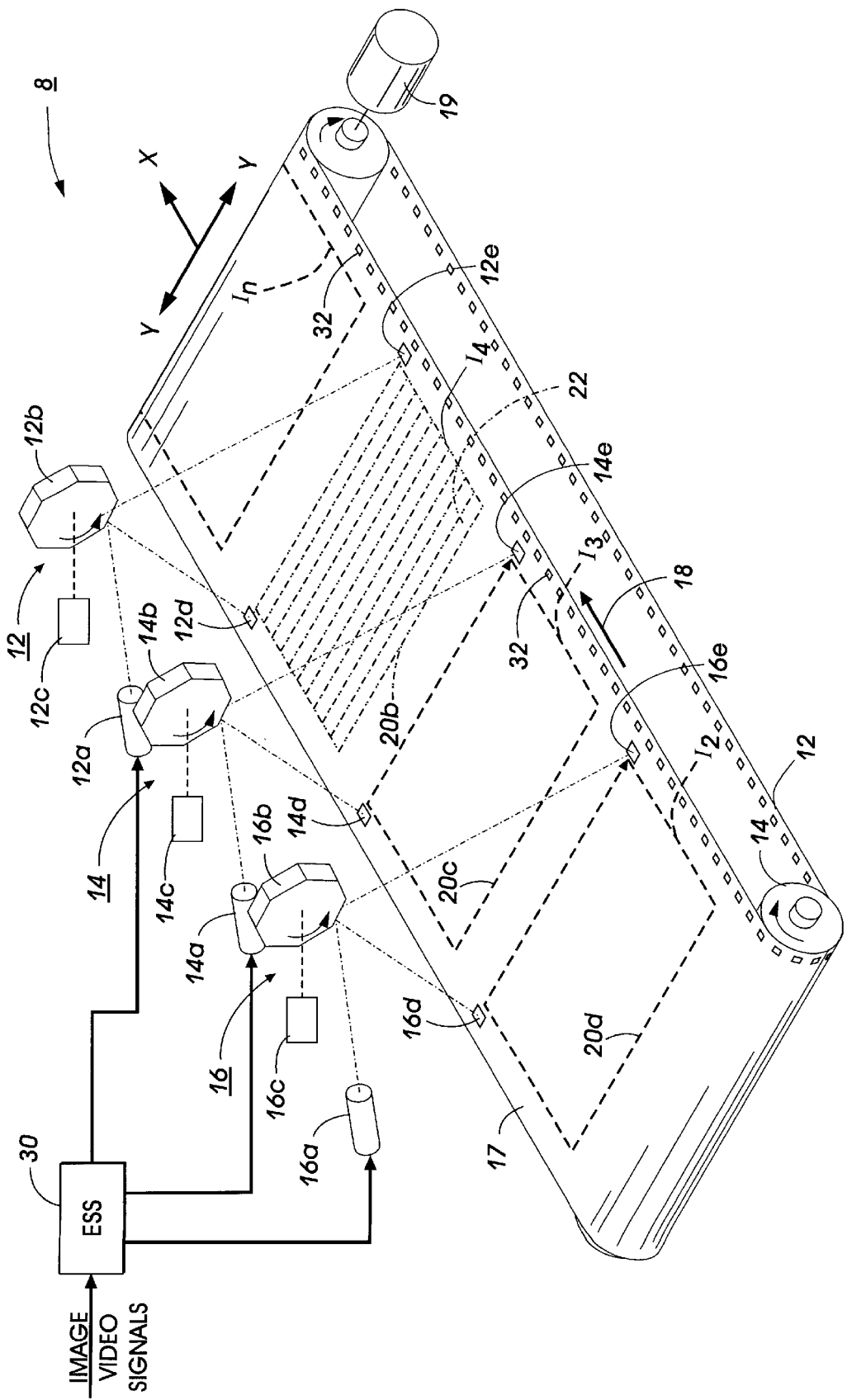
FIG. 1 is a schematic perspective view of a single pass, multiple ROS system for forming color registered images of the present invention.

FIG. 1 shows a single pass, ROS process color printing system 8 having three ROS systems, 12, 14, and 16. A fourth station may be used if desired to achieve full process color including black. The system 8 includes a photoreceptor belt 17, driven in the process direction, indicated by the arrow 18. The length of the belt 17 is designed to accept an integral number of spaced image areas represented by dashed line rectangles in FIG. 1. Three image areas, I2, I3, and I4, are represented but additional image frames (In) may be used depending on system specifications.

Upstream of each image area is a charging station (not shown) which places a predetermined electrical charge on the surface of belt 17. As each of the image areas I2, I3 and I4 reaches a transverse line of scan, represented by lines 20b, 20c and 20d, the area is progressively exposed on closely spaced transverse raster lines 22, shown with exaggerated longitudinal spacing on the image area 14 in FIG. 1. Lines 20b, 20c and 20d represent the first scan line of the associated images frames, I2, I3 and I4. Each image area I2, I3 and I4 is exposed successively by ROS systems 12, 14, and 16.

Downstream from each exposure station, a development station (not shown) develops the latent image formed in the preceding image area. A fully developed color image is then transferred to an output sheet. Details of charge and development xerographic stations in a multiple exposure single pass system are disclosed, for example, in U.S. Pat. No. 4,660,059, commonly assigned as the present application and hereby incorporated by reference. The charge, development, and transfer stations are conventional in the art.

Each ROS system contains its own conventional scanning components, of which, only the laser light source, the rotating polygon, and the polygon drive motor are shown. For example, the ROS system 12 has a gas, or preferably, laser diode 12a, whose output is modulated by signals from control circuit 30 and optically processed to impinge on the facets of rotating polygon 12b, rotated by motor 12c. Each facet of polygon 12b reflects the modulated incident laser beam as a scan line, which is focused at the photoreceptor surface, using conventional post-polygon optics (not shown). Control circuit 30 contains the circuit and logic modules which respond to input video data signals and other control and timing signals to operate the photoreceptor drive synchronously with the image exposure and to control the rotation of the polygon 12b by the motor 12c. The other ROS systems 14 and 16, have their own associated laser diodes 14a and 16a, polygon mirrors 14b and 16b, and polygon motors 14c and 16c, respectively.

Figure 2:
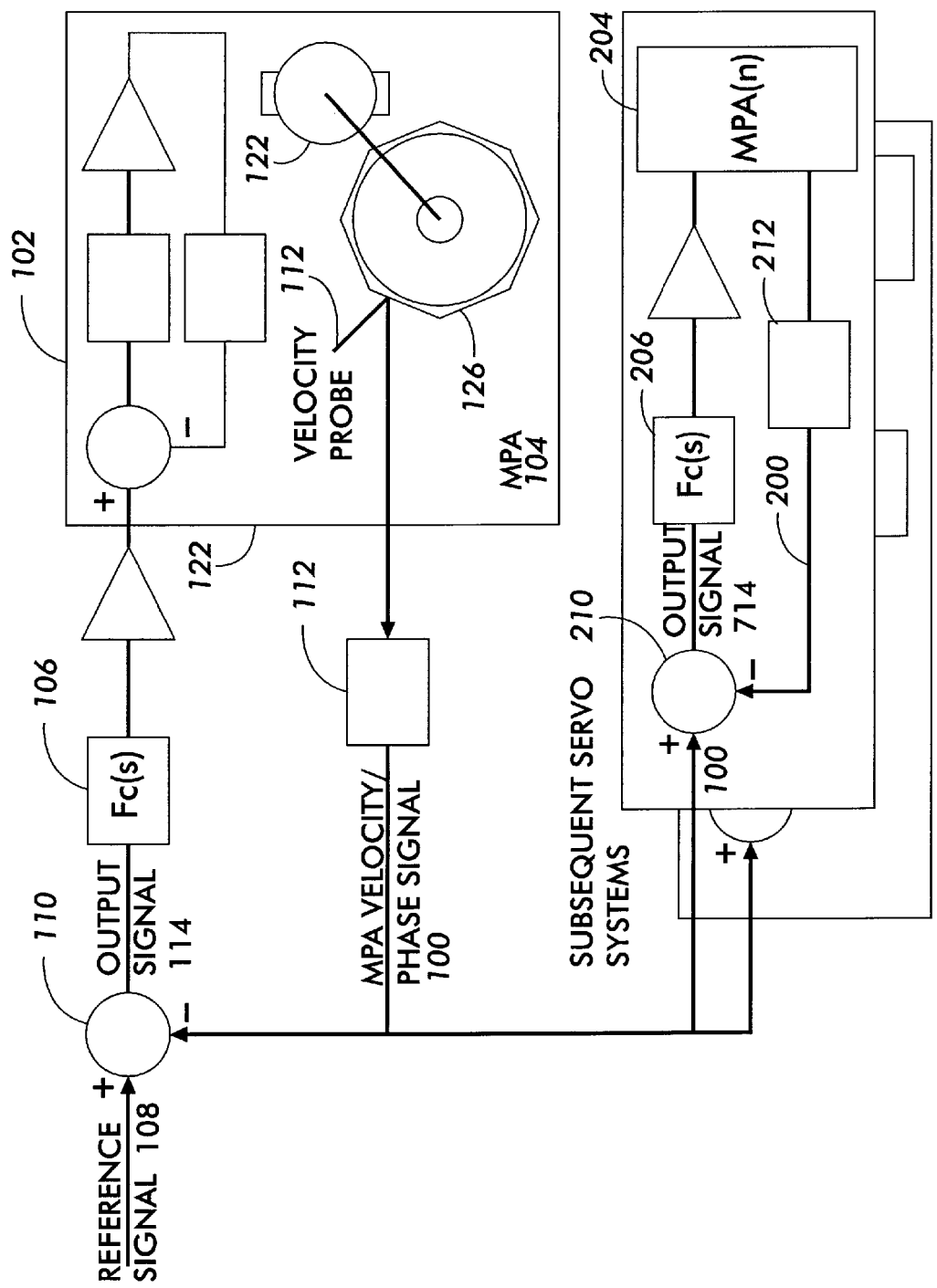
FIG. 2 is a schematic block diagram of the feedback loop circuit for a first embodiment of a synchronization system for the multiple ROS in the printing system of this present invention.
Figure 3:
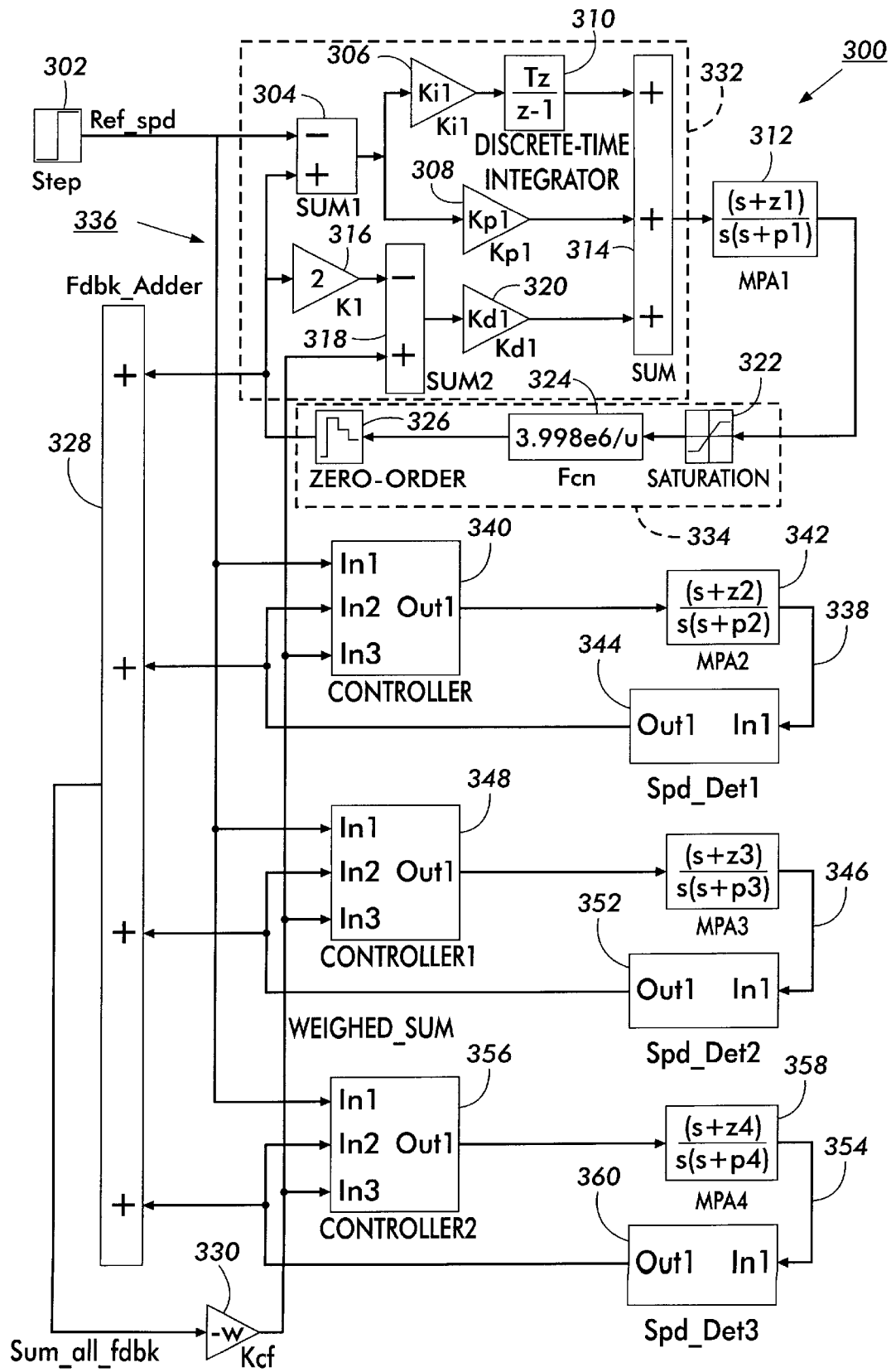
FIG. 3 is a schematic block diagram of the feedback loop circuit for a second embodiment of a synchronization system for the multiple ROS in the printing system of this present invention.

As shown in FIG. 2, polygon motors 12c, 14c, and 16c are phase locked to a stable reference signal and synchronized so that the position of the scan lines formed by their respective ROS systems are fixed relative to one another and thus, lacking any other error sources, are registered in the process direction.

A signal 100 in a closed feedback loop regulates the angular velocity and phase of the first rotating polygon 12c. The same signal 100 is also the reference signal to the feedback loops of the other rotating polygons 14c and 16c to synchronize the velocities and phases of all three rotating polygons.

The motor 12c rotating the polygon mirror 12b can be a DC brushless motor. The polygon motor 12b is driven using a full bridge driver 102. The entire motor polygon assembly (MPA) 104 of polygon mirror 12c, motor 12b and driver 102 is characterized by the electrical and mechanical motor transfer functions.

A proportional integral derivative (PID) controller 106 drives the MPA 104 so that the motor and attached polygon mirror rotate at a desired speed. This desired speed is set by the reference signal 108 from the control circuit 30 at the summing junction 110.

A tachometer unit 112 has a conventional coil and magnet assembly (not shown) to provide the angular velocity and phase of the rotating polygon 12b and its motor 12c. The tachometer unit 112 emits a signal 100 which indicates the MPA velocity and phase. This velocity/phase signal 100 is connected to the summing junction 110 along with the reference signal 108. The output signal 114 from the summing junction 110 to the PID controller 106 either maintains the current velocity and phase of the MPA 104 or increases it or decreases it. The controller 106 through the driver 104 adjusts the speed of the motor 12c rotating the polygon mirror 12b accordingly.

The unit 112 could, in the alternative, be a photodetector, an optical resolver, or an encode to emit the MPA velocity and phase signal.

The feedback loop is, thus, the reference signal from the control circuit and the velocity/phase signal from the tachometer unit being input at the summing junction. The output signal from the summing junction is used by the PID controller to regulate, through the driver, the speed of the polygon mirror rotated by the motor. The velocity of the polygon and motor generates the velocity/phase signal through the tachometer unit.

The MPA velocity/phase signal 100 from the first ROS unit 12 also serves as the reference signal for the other feedback loops of the other ROS units 14 and 16.

Thus, the MPA velocity/phase signal 100 as the reference signal in the ROS unit 14 is connected to the summing junction 210. The output signal 214 from the summing junction 210 to the PID controller 206 either maintains the current velocity and phase of the MPA 204 or increases it or decreases it. The controller 206 through the driver 202 adjusts the speed of the motor 14c rotating the polygon mirror 14b accordingly. The velocity and phase of the polygon and motor generates the velocity/phase signal 200 through the tachometer unit 212. This velocity/phase signal 200 is connected to the summing junction 210 along with the reference signal 100.

The feedback loop of the second ROS unit is, thus, the reference signal from the velocity phase signal of the first ROS unit and the velocity/phase signal from the tachometer unit of the second ROS unit being input at the summing junction. The output signal from the summing junction is used by the PID controller to regulate, through the driver, the speed of the polygon mirror rotated by the motor. The velocity of the polygon and motor generates the velocity/ phase signal through the tachometer unit.

The PID controller in the first ROS unit 12 uses a feedback loop to adjust the rotational velocity of the polygon to maintain synchronization of the polygons and registration of the images scanned by the polygons. The feedback loop can have a velocity probe sensor which senses the velocity of rotation of the polygon. The sensed velocity is input to a tachometer which inputs a velocity/phase signal to the summer which compares the signal to the reference signal. The velocity/phase signal is the reference signal for the subsequent ROS units 14 and 16.

Reference is now made to the second embodiment 300 of the synchronization system for multiple ROS's to form registered color images in a single pass system.

A reference signal indicating a reference speed for the motor polygon assembly is generated by a pulse generator 302. The pulse generator can be a xtal oscillator and programmable counters.

The reference signal and the first feedback signal are connected to the first summing junction 304, where the difference in phase is calculated and termed "error" hereafter.

The resulting output signal from the first summing junction, the error signal, is fed to the inputs of the integral gain amplifier 306 and the proportional gain amplifier 308.

The output signal from the first summing junction 304 is input to the integral gain 306. The integral gain integrates and scales the output signal by an integral gain factor to produce an integral gain signal. The resulting integral gain signal is input to the discrete time integrator 310.

The resulting discrete time integrated integral gain signal is the first signal inputted to the proportional integral derivative (P.I.D.) summing junction 314.

The output signal from the first summing junction 304 is input to the proportional gain 308. The proportional gain scales the error signal by a predetermined proportion al gain factor to produce a proportional gain signal. The resulting proportional gain signal is the second signal inputted to the proportional integral derivative (P.I.D.) summing junction 314.

The first feedback signal is inputted into the K1 feedback gain amplifier 316. The K1 gain amplifier scales the weight of the local feedback f rom the synchronization system in comparison to the cumulative feedback from the other synchronization systems of the other ROS's. Appropriate selection of the K1 enables control of responsivity of each synchronization system to its own feedback versus the feedback from the other synchronization systems.

The resulting K1 signal and the weighted summed feedback signal are connected to the second summing junction 318. The output signal from the second summing junction is input to the differential gain amplifier 320. The differential gain amplifier differentiates and scales the output signal by a gain factor to produce a differential gain signal. The resulting differential value is the third signal inputted to the proportional integral derivative (P.I.D.) summing junction 314.

The three signals inputted to the proportional integral derivative (P.I.D.) summing junction 314 are the integral and the proportional components of the error and the differential component of the local and cumulative feedback signals. The resulting signal will be a summed function of all three components. The resulting summed gain signal is input to the transfer function of the first motor polygon assembly (MPA) 312.

In the feedback path loop, the velocity phase signal (transfer function signal) from the MPA 312 is inverted by an invertor 322. The invertor inverts the signal, speed to time. Saturation limits are set to bound the output of the invertor to a finite range.

The inverted signal is inputted to a feedback gain amplifier 324. The feedback gain scales the inverted signal by a predetermined factor based on the desired overall gain and dynamic response. The resulting feedback gain signal is inputted to a zero order hold 326.

The zero order hold 326 is a buffer used to insure that the outputs from each subsystem of the synchronization system are passed to other subsystems only after the particular cycle is complete. The zero order hold buffer keeps the output of the feedback loop constant—all of the subsystem's outputs change simultaneously and change only at predefined times. The zero order hold holds the first feedback signal.

Once released by the zero order hold, the resulting first feedback signal is fed to the inputs of the first summing junction 304, the K1 316 and the feedback adder 328.

The first feedback signal is inputted to the feedback adder 328, a summing junction, with the feedback signals from the other MPAs in the multiple ROS's. Ideally, all the feedback signals are zero. If there is a positive feedback signal from any or some or all of the sources, the summed feedback signal from the feedback adder is input to the weighting Kcf amplifier 330. The weighting Kcf scales the inverted signal by a predetermined weighting factor based on desired performance. The resulting weighted summed feedback signal is input to the second summing junction 318.

The values for the integral gain, the proportional gain and the differential gain are predetermined based upon operating characteristics of the mechanical components of the controlled system to be synchronized, i.e. the motor polygon assembly 312. This improves the feedback loop by permitting feedback parameters such as the proportional gain, integral gain, and differential gain to be adjusted in response to the feedback signal from the first motor polygon assembly and the summed weighted feedback signal from all the motor polygon assemblies.

The reference signal is the speed at which the MPA is designed to rotate under ideal circumstances. The feedback loop generates the error feedback signal representing the difference between the reference speed and the actual synchronized speed. The error feedback signal is used by the PID controller along with the reference signal to adjust the speed for the next cycle.

The proportional integral derivative (P.I.D.) controller 332 consists of the first summing junction 304, the integral gain 306, and the discrete time integrator 310; the proportional gain 308; the K1 316, the second summing junction 318 and the differential gain 320; and the proportional integral derivative (P.I.D.) summing junction 314. The input signals to the P.I.D. controller are the reference signal, the first feedback signal and the weighted summed feedback signal. The output signal from the P.I.D. controller is the summed gain signal.

The summed gain signal is input to the transfer function of the first motor polygon assembly (MPA) 312.

In the feedback path loop, the speed detector 334 includes the invertor 322, the feedback gain 324 and the zero-order hold 326. The input signal for the speed detector is the velocity/phase signal. The output signal from the speed detector is the first feedback signal.

These three elements of the P.I.D. controller 332, the MPA 312 and the speed detector 334336 form the synchronization system for the first ROS of multiple ROS's which form registered color images in a single pass system.

The second polygon ROS has a separate three element synchronization system 338 of a second P.I.D. controller 340, a second MPA 342 and a second speed detector 344. The input signals to the second P.I.D. controller 340 are the reference signal, the second feedback signal and the weighted summed feedback signal. The output signal from the second P.I.D. controller 340 is the second summed gain signal.

The second summed gain signal is input to the transfer function of the second motor polygon assembly (MPA) 342.

The input signal for the second speed detector 344 in the feedback loop is the second velocity/phase signal. The output signal from the second speed detector 344 is the second feedback signal.

The third polygon ROS has a separate three element synchronization system 346 of a third P.I.D. controller 348, a third MPA 350 and a third speed detector 352. The input signals to the third P.I.D. controller 348 are the reference signal, the third feedback signal and the weighted summed feedback signal. The output signal from the third P.I.D. controller 348 is the third summed gain signal.

The third summed gain signal is input to the transfer function of the third motor polygon assembly (MPA) 350.

The input signal for the third speed detector 352 in the feedback loop is the third velocity/phase signal. The output signal from the third speed detector 352 is the third feedback signal.

The fourth polygon ROS has a separate three element synchronization system 354 of a fourth P.I.D. controller 356, a fourth MPA 358 and a fourth speed detector 360. The input signals to the fourth P.I.D. controller 3356 are the reference signal, the fourth feedback signal and the weighted summed feedback signal. The output signal from the fourth P.I.D. controller 356 is the fourth summed gain signal.

The fourth summed gain signal is input to the transfer function of the fourth motor polygon assembly (MPA) 358. The input signal for the fourth speed detector 360 in the feedback loop is the fourth velocity/phase signal. The output signal from the fourth speed detector 360 is the fourth feedback signal.

The first feedback signal, the second feedback signal, the third feedback signal and the fourth feedback signal are inputted to the feedback adder 328, a summing junction. Ideally, all the feedback signals are zero. If there is a positive feedback signal among any or some or all of the feedback signals, the summed feedback signal from the feedback adder 328 is input to the weighting junction Kcf 330. The resulting weighted summed feedback signal is input to the second summing junction of each of the P.I.D. controllers of the four synchronization systems of the ROS's.

Any MPA to MPA operational differences are eventually cascaded as color to color misregistration. Synchronization of the MPA's and the ROS units minimizes the misregistration. By replicating the rotational characteristics of the first ROS unit, all subsequent ROS units will be synchronized to minimize MPA related misregistrations.

An additional advantage is that the subsequent MPA's can be rotated in anytime after the initialization of the first MPA. Power saver mode will also be available since the subsequent MPA's could be brought up to synchronized speed while the initial ROS is scanning. This will result in power supply load management by distributing load profile and allowing power saver mode.

The PID controller can be either discrete time or continuous with the key distinction being that the controller use a phase detector to track both phase and frequency.

With the phases of each ROS unit synchronized, the expected error levels are limited to facet jitter or facet to facet variations. Other than this quantifiable error level, the ROS units will achieve synchronization. All the ROS units will have replicated the scan characteristics of the first ROS unit.

It is assumed that the various ROS system units 12, 14 and 16 have been initially aligned to correct for any transverse registration errors.

While a full color system has been described with three image areas, the invention may be practiced in a highlight color system wherein two exposure areas, black and a second color, are exposed by two ROS units.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An imaging system for forming multiple image exposure frames on a photoconductive member during a single pass comprising:

a plurality of Raster Output Scanners (ROS) units, each ROS unit associated with the formation of one of said multiple image exposure frames, each ROS unit forming a plurality of projected scan lines in a fast scan direction across the width of said photoconductive member, by reflecting modulated beams from multi-faceted surfaces of a rotating polygon associated with each one of said ROS units, each polygon being rotated by a separate drive motor, means for detecting the velocity and phase of said rotating polygon and providing a velocity/phase signal representing such detection, wherein said velocity/phase signal from a first ROS unit is the reference signal for said other ROS units means for generating a stable reference signal for the velocity and phase of said rotating polygon, means for comparing said velocity/phase signal and said reference signal and means for generating an output signal, and means for adjusting the velocity to each of said polygon motors in response to said output signal in a feedback loop whereby all of said polygon motors are synchronized in velocity and phase.

2. The imaging system of claim 1 wherein said means for detecting the velocity and phase of said rotating polygon and providing a velocity/phase signal representing such detection is a tachometer unit.

3. The imaging system of claim 1 wherein said means for adjusting the velocity to each of said polygon motors in response to said output signal is a proportional integral derivative controller.

4. An imaging system for forming multiple image exposure frames on a photoconductive member during a single pass comprising:

a plurality of Raster Output Scanners (ROS) units, each ROS unit associated with the formation of one of said multiple image exposure frames, each ROS unit forming a plurality of projected scan lines in a fast scan direction across the width of said photoconductive member, by reflecting modulated beams from multi-faceted surfaces of a rotating polygon associated with each of said plurality of ROS units, each polygon being rotated by a separate drive motor, and a synchronization system for each of said plurality of ROS units having a proportional integral derivative controller having a first input to receive a reference signal, a second input to receive a feedback signal, a third input to receive a weighted summed feedback signal from said plurality of ROS units, said proportional integral derivative controller having an output to a transfer function of said drive motor to said rotating polygon, said proportional integral derivative controller adjusting the velocity to said drive motor to said rotating polygon whereby all of said drive motors to said rotating polygons of said plurality of ROS units are synchronized in velocity and phase.

5. The imaging system for forming multiple image exposure frames on a photoconductive member during a single pass of claim 4 wherein said proportional integral derivative controller further comprises proportional gain means for scaling a first signal by a proportional gain factor to produce a proportional feedback signal, integral gain means for integrating and scaling a second signal by an integral gain factor to produce an integral feedback signal, and differential gain means for differentiating and scaling a third signal by a differential gain factor to produce a differential feedback signal, such that said proportional integral derivative controller produces said output as a function of said proportional feedback signal, said integral feedback signal and said differential feedback signal.

6. The imaging system for forming multiple image exposure frames on a photoconductive member during a single pass of claim 5 wherein said synchronization system further comprises a speed detector in a feedback loop, said speed detector having a first input to receive said velocity/phase signal from said the transfer function of said drive motor to said rotating polygon and an output of a feedback signal coupled to said proportional integral derivative controller and a feedback adder.

7. The imaging system for forming multiple image exposure frames on a photoconductive member during a single pass of claim 6 wherein said speed detector further comprises an invertor for inverting said velocity/phase signal, a feedback gain for scaling by a feedback factor a signal from said invertor, and a zero order hold for holding a signal from said feedback gain and releasing said feedback signal to said proportional integral derivative controller and said feedback adder.

8. The imaging system for forming multiple image exposure frames on a photoconductive member during a single pass of claim 7 wherein said feedback adder sums all of said feedback signals from all of said synchronization systems for said plurality of ROS units, said feedback adder having an output of a summed feedback signal.

9. The imaging system for forming multiple image exposure frames on a photoconductive member during a single pass of claim 8 wherein said feedback adder further comprises a weighted junction having an input of said a summed feedback signal and an output of a weighted summed feedback signal which is input to all of said proportional integral derivative controllers of said synchronization systems for said plurality of ROS units, said weighted junction scaling by a weighted factor said summed feedback signal.

* * * * *